Patented Jan. 12, 1937

2,067,468

UNITED STATES PATENT OFFICE 2,067,468

ACID WOOL DYESTUFFS OF THE ANTHRAQUINONE SERIES

Klaus Weinand, Leverkusen-I. G. Werk, and Curt Bamberger, Cologne-Mulheim, Germany, assignors to General Aniline Works, Inc., New York, N. Y., a corporation of Delaware No Drawing. Application August 30, 1935, Serial No. 38,661. In Germany September 14, 1934

5 Claims. (Cl. 260—60)

The present invention relates to new anthraquinone derivatives.

In accordance with our present invention new acid wool dyestuffs are obtained by causing aromatic amines to react upon 1-hydroarylamino-4-halogenanthraquinonesulfonic acids which contain the sulfonic acid group in a $\beta$-position of the 5,8-ring of the anthraquinone nucleus, i. e. in 6- or 7-position. This process is preferably carried out in an aqueous alkaline solution while employing copper salts as catalysts.

The new acid wool dyestuffs which are obtainable in accordance with our present invention may be defined as 1-hydroarylamino-4-arylaminoanthraquinones which have the sulfonic acid group in a $\beta$-position of the other nucleus. The term "hydroarylamino" is intended to embrace such arylamino groups as have the aryl residue wholly or partly hydrogenated. Typical examples for groups of the character described are the hexahydrobenzene or the tetrahydronaphthalene residue. These new acid wool dyestuffs dye wool from an acid bath very clear bluish-green to green shades of excellent fastness properties and show a good equalizing effect. When compared with the isomeric dyestuffs which contain the sulfonic acid group in the aryl residue, our new dyestuffs dye more greenish shades.

The following examples illustrate the invention without restricting it thereto the parts being by weight:—

Example 1

10 parts of 1-hexahydroanilido-4-bromoanthraquinone-6-sulfonic acid (obtained from 1-hexahydroanilido-6-sulfonic acid by the action of bromide in aqueous solution) are boiled for 4 hours while refluxing with 10 parts of para-anisidine and with the addition of 10 parts of sodium bicarbonate and 0.5 part of cuprous chloride in a mixture of 150 parts of water and 50 parts of alcohol. After cooling the dyestuff obtained is precipitated by the addition of acid and then recrystallized. It represents green needles which dissolve in water with a green coloration and dye wool from an acid bath vivid green shades.

Example 2

10 parts of 1-hexahydroanilido-4-bromoanthraquinone-6-sulfonic acid or of the corresponding 7-sulfonic acid are heated for 6 hours to 60–80° C. with 10 parts of para-amino-acetanilide with the addition of sodium bicarbonate and 0,5 part of cuprous chloride in 150 parts of water. After cooling the separated dyestuff is sucked off and recrystallized from water. It represents green needles which dissolve in water with a green coloration and dye wool from an acid bath vivid green shades.

Example 3

10 parts of 1-hexahydroanilido-4-bromoanthraquinone-6-sulfonic acid are heated for 6 hours to 60–80° C. with 10 parts of meta-aminoacetanilide and the addition of 10 parts of sodium bicarbonate and 0.5 part of cuprous chloride in 150 parts of water. After cooling the dyestuff obtained is sucked off and recrystallized from water. It represents blue needles which dissolve in water with greenish-blue coloration and dye wool from an acid bath vivid greenish-blue shades.

When replacing the meta-aminoacetanilide by the dimethylamide of meta-amino benzoic acid, a dyestuff of similar shade and similar properties is obtained.

Example 4

10 parts of 1-hexahydroanilido-4-bromoanthraquinone-6-sulfonic acid are boiled for 4 hours with 10 parts of aniline and the addition of 10 parts of sodium bicarbonate and 0,5 part of cuprous chloride in a mixture of 150 parts of water and 50 parts of alcohol. After cooling the dyestuff obtained is separated out by the addition of acid and then recrystallized from water. It represents blue needles, which dissolve in water with bluish-green coloration and dye wool from an acid bath vivid bluish-green shades.

When replacing aniline by the equal amount of the methyl-ester of meta-aminobenzoic acid, dyestuffs of similar properties are obtained which have a more blue shade.

Example 5

10 parts of 1-hexahydroanilido-4-bromoanthraquinone-6-sulfonic acid are heated with 10 parts of meta-aminobenzo-nitril in a mixture of 150 parts of water and 50 parts of alcohol while refluxing and while adding thereto 10 parts of sodium bicarbonate and 0,5 part of cuprous chloride. Heating is continued until the reaction is complete. After cooling the dyestuff is isolated from the reaction mixture by the addition of an acid and then recrystallized from water. It represents blue needles which dissolve in water with bluish coloration and dye wool from an acid bath vivid blue shades.

*Example 6*

10 parts of 1-tetrahydro-β-naphthylamino-4-bromoanthraquinone-6-sulfonic acid and 10 parts of para-aminoacetanilide are heated to 70–80° C. with the addition of 10 parts of sodium bicarbonate and 0.5 part of cuprous chloride in 200 parts of water, until the starting material has completely disappeared. It forms bluish-green needles, which dissolve in water with a green coloration. The dyestuff dyes wool from an acid bath green shades.

We claim:—

1. The 1-hydroarylamino-4-anilinoanthraquinones which contain a sulfonic acid group in a β-position of the 5,8-ring of the anthraquinone nucleus.
2. The hexahydroanilido-4-anilinoanthraquinones which have a sulfonic acid group in a β-position of the 5,8-ring of the anthraquinone nucleus.
3. The 1-hexahydroanilido-4-para-aminoacetanilidoanthraquinone-6-sulfonic acid.
4. The 1-hexahydroanilido-4-para-aminoacetanilidoanthraquinone-7-sulfonic acid.
5. The 1-hexahydroanilido-4-meta-cyananilidoanthraquinone-6-sulfonic acid.

KLAUS WEINAND.
CURT BAMBERGER.